United States Patent
Hathorn et al.

(10) Patent No.: US 10,013,386 B2
(45) Date of Patent: Jul. 3, 2018

(54) PRESERVATION OF PORT CONTROL BLOCK INFORMATION RELATED TO LOGINS AND STATES OF REMOTE PORTS DURING A CODE LOAD IN AN EMBEDDED PORT

(71) Applicant: INTERNATIONAL BUSINESS MACHINES CORPORATION, Armonk, NY (US)

(72) Inventors: Roger G. Hathorn, Tucson, AZ (US); Steven E. Klein, Tucson, AZ (US); Mikel W. Welsh, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 14/870,549

(22) Filed: Sep. 30, 2015

(65) Prior Publication Data
US 2017/0091136 A1 Mar. 30, 2017

(51) Int. Cl.
*G06F 13/00* (2006.01)
*G06F 13/42* (2006.01)
*G06F 13/38* (2006.01)
*G06F 3/06* (2006.01)
(Continued)

(52) U.S. Cl.
CPC ............ *G06F 13/426* (2013.01); *G06F 3/065* (2013.01); *G06F 3/067* (2013.01); *G06F 3/0619* (2013.01); *G06F 13/387* (2013.01); *G06F 9/4411* (2013.01); *G06F 13/385* (2013.01); *G06F 13/4072* (2013.01)

(58) Field of Classification Search
None
See application file for complete search history.

(56) References Cited

U.S. PATENT DOCUMENTS

| | | | |
|---|---|---|---|
| 8,375,385 | B1 | 2/2013 | Harel et al. |
| 8,397,092 | B2 | 3/2013 | Karnowski |
| 8,949,656 | B1 | 2/2015 | Ninan et al. |

(Continued)

FOREIGN PATENT DOCUMENTS

| | | |
|---|---|---|
| WO | 2008142079 | 11/2008 |
| WO | 2008146534 | 12/2008 |

(Continued)

OTHER PUBLICATIONS

Office Action dated May 17, 2017, pp. 29, for U.S. Appl. No. 14/870,569, filed Sep. 30, 2015.

(Continued)

*Primary Examiner* — Henry Tsai
*Assistant Examiner* — Aurangzeb Hassan
(74) *Attorney, Agent, or Firm* — Rabindranath Dutta; Konrad Raynes Davda & Victor LLP

(57) ABSTRACT

Information maintained in a port control block of an embedded port of a host bus adapter is stored in a host bus adapter memory, wherein the information corresponds to login attributes and state data of remote ports. In response to storing the information in the host bus adapter memory, code in the embedded port is updated. In response to the updating of the code in the embedded port, the stored information is restored from the host bus adapter memory to the port control block of the embedded port.

20 Claims, 7 Drawing Sheets

(51) Int. Cl.
*G06F 9/4401* (2018.01)
*G06F 13/40* (2006.01)

(56) References Cited

U.S. PATENT DOCUMENTS

| | | | |
|---|---|---|---|
| 2003/0212859 A1* | 11/2003 | Ellis | G06F 3/0613 |
| | | | 711/114 |
| 2005/0021605 A1* | 1/2005 | Davies | G06F 11/1456 |
| | | | 709/203 |
| 2006/0047879 A1* | 3/2006 | Hack | G06F 13/423 |
| | | | 710/302 |
| 2009/0252063 A1 | 10/2009 | Owen et al. | |
| 2010/0191723 A1 | 7/2010 | Perez et al. | |
| 2013/0007183 A1 | 1/2013 | Sorenson, III et al. | |
| 2013/0151646 A1* | 6/2013 | Chidambaram | H04L 47/6205 |
| | | | 709/213 |
| 2013/0346667 A1 | 12/2013 | Stroud et al. | |
| 2014/0012414 A1 | 1/2014 | Perez et al. | |
| 2014/0254371 A1 | 9/2014 | Chan et al. | |
| 2014/0259000 A1 | 9/2014 | Desanti et al. | |
| 2015/0154017 A1 | 6/2015 | Yiuan et al. | |
| 2015/0161391 A1 | 6/2015 | Johnsen et al. | |
| 2016/0092259 A1 | 3/2016 | Mehta et al. | |
| 2017/0090899 A1 | 3/2017 | Hathorn et al. | |
| 2017/0090911 A1 | 3/2017 | Hathorn et al. | |

FOREIGN PATENT DOCUMENTS

| | | |
|---|---|---|
| WO | 2010014381 | 2/2010 |
| WO | 2015088887 | 6/2015 |

OTHER PUBLICATIONS

Office Action dated May 31, 2017, pp. 28, for U.S. Appl. No. 14/870,554, filed Sep. 30, 2015.
"Information Technology—Fibre Channel Protocol for SCSI, Fourth Version (FCP-4)", American National Standard T10 Project 1828-D, Revision 02b, Jan. 3, 2011, pp. 147.
Yang, et al., "Interoperability and Performance Analysis of IEC61850 Based Substation Protection System", World Academy of Science, Engineering and Technology, International Journal of Electrical, Computer, Energetic, Electronic and Communication Engineering vol. 7 No. 8, 2013, pp. 8.
"Fibre Channel Single-Byte Command Code Sets Mapping Protocol—5 (FC-SB-5)", Rev. 2.00, American National Standard for Information Technology, Mar. 26, 2013, pp. 269.
"DGS-1210 Series Gigabit Smart Switches with Fibre Uplinks", D-Link Corporation, May 2013, pp. 6.
"Fibre Channel Link Service (FC-LS-3)", Rev. 3.10, American National Standard for Information Technology, Feb. 1, 2014, pp. 207.
"Fibre Channel Framing and Signaling—4 (FC-FS-4)", Rev. 1.20, American National Standard for Information Technology, Jul. 21, 2015, pp. 463.
U.S. Appl. No. 14/870,554, filed Sep. 30, 2015, by inventors R.G. Hathorn, S.E. Klein and M.W. Welsh.
U.S. Appl. No. 14/870,385, filed Sep. 30, 2015, by inventors R.G. Hathorn, B.W. Holley, and S.E. Klein.
U.S. Appl. No. 14/870,393, filed Sep. 30, 2015, by inventors C.S. Cardinell, R.G. Hathorn, S.E. Klein and B. Laubli.
U.S. Appl. No. 14/870,410, filed Sep. 30, 2015, by inventors C.S. Cardinell, R.G. Hathorn, S.E. Klein and B. Laubli.
U.S. Appl. No. 14/870,422, filed Sep. 30, 2015, by inventors M.P. Bendyk, C.S. Cardinell, R.G. Hathorn, and S.E. Klein.
U.S. Appl. No. 14/870,569, filed Sep. 30, 2015, by inventors R.G. Hathorn, S.E. Klein and M.W. Welsh.
List of Patents or Patent Applications Treated as Related, dated Sep. 30, 2015, pp. 2.
Response dated Aug. 7, 2017, pp. 12, to Office Action dated May 17, 2017, pp. 29, for U.S. Appl. No. 14/870,569, filed Sep. 30, 2015.
Response dated Aug. 30, 2017, pp. 12, to Office Action dated May 31, 2017, pp. 28, for U.S. Appl. No. 14/870,554, filed Sep. 30, 2015.
Final Office Action dated Dec. 1, 2017, pp. 23, for U.S. Appl. No. 14/870,554, filed Sep. 30, 2015.
Final Office Action dated Dec. 1, 2017, pp. 28, for for U.S. Appl. No. 14/870,569, filed Sep. 30, 2015.
Notice of Allowance dated Mar. 21, 2018, pp. 14, for U.S. Appl. No. 14/870,554, filed Sep. 30, 2015.
Notice of Allowance dated Mar. 21, 2018, pp. 14, for U.S. Appl. No. 14/870,569, filed Sep. 30, 2015.
Response dated Mar. 1, 2018, pp. 15, to Final Office Action dated Dec. 1, 2017, pp. 23, for U.S. Appl. No. 14/870,554, filed Sep. 30, 2015.
Response dated Mar. 1, 2018, pp. 15, to Final Office Action dated Dec. 1, 2017, pp. 28, for for U.S. Appl. No. 14/870,569, filed Sep. 30, 2015.

* cited by examiner

PRESERVATION OF PORT CONTROL BLOCK INFORMATION RELATED TO LOGINS AND STATES OF REMOTE PORTS DURING A CODE LOAD IN AN EMBEDDED PORT

BACKGROUND

1. Field

Embodiments relate to the preservation of port control block information related to login and states of remote ports during a code load in an embedded port.

2. Background

A storage controller may control access to storage for one or more host computational devices that may be coupled to the storage controller over a network. A storage management application that executes in the storage controller may manage a plurality of storage devices, such as disk drives, tape drives, flash drives, etc., that are coupled to the storage controller. A host may send Input/Output (abbreviated as I/O or IO) commands to the storage controller and the storage controller may execute the I/O commands to read data from the storage devices or write data to the storage devices.

A host bus adapter (HBA) may comprise a circuit board and/or integrated circuit based adapter that may include components such as a Fibre Channel interface chip, where the Fibre Channel interface chip may be referred to as an embedded port. The host bus adapter may provide I/O processing and provide physical connectivity for the storage controller to a storage area network (SAN), where the storage area network includes a Fibre Channel switched fabric. The storage controller (via the host bus adapter) may act as a target that receives I/O commands from the one or more host computational devices, where the one or more host computational devices act as initiators of the I/O commands.

Communication between the hosts and the storage controller may occur over a Fibre Channel (FC) network, where Fibre Channel refers to an integrated set of architectural standards for data transfer being developed by the American National Standards Institute. Fibre Channel is a high-speed network technology primarily used for storage area networks. Fibre Channel Protocol (FCP) is a transport protocol that predominantly supports transports commands over Fibre Channel networks.

Fibre Channel may be split into five layers: a Protocol-mapping layer (FC-4), a common service layer (FC-3), a network layer (FC-2), a data link layer (FC-1), and a FC-0 layer that defines the physical link in the system, including the fibre, connectors, optical and electrical parameters for a variety of data rates. Layers FC-0 through FC-2 are also known as FC-PH, the physical layers of Fibre Channel, whereas FC-3 and FC-4 layers define how Fibre Channel ports interact with applications in computational devices. The FC-3 layer of the FC standard is intended to provide the common services for features such as striping, multicasting, etc.

FC-4, the highest layer in Fibre Channel, defines the application interfaces that execute over Fibre Channel. FC-4 specifies the mapping rules of upper layer protocols using the FC layers below. FC-4 is formed by a series of profiles that define how to map legacy protocols to Fibre Channel. Fibre Channel is capable of transporting both network and channel information, and profiles for network and channel protocols, such as, Small Computer System Interface (SCSI), Intelligent Peripheral Interface (IPI), High Performance Parallel Interface (HIPPI) Framing Protocol, Internet Protocol (IP), Link Encapsulation (FC-LE), Single-Byte Command Code Set Mapping (SBCCS), etc., may be specified or proposed as protocol mappings in FC-4.

Fibre Connection (FICON) is a protocol of the fibre channel architecture and may also be referred to by the formal name of FC-SB-5. FICON is a protocol layer that builds upon the Fibre Channel transport protocol. Further details of Fibre Channel protocol mapping for the Single-Byte Command Code Sets may be found in the publication, "Fibre Channel Single-Byte Command Code Sets Mapping Protocol-5 (FC-SB-5)", Rev. 2.0, published by the American National Standards Institute on Mar. 26, 2013.

The basic building blocks of a Fibre Channel connection are called "Frames". The frames contain the information to be transmitted (Payload), the address of the source (i.e., initiator) and destination (i.e., target) ports and link control information. Frames are broadly categorized as data frames and link control frames. Details of framing and signaling aspects of Fibre Channel may be found in the publication, "Fibre Channel Framing and Signaling-4 (FC-FS-4)", Rev. 1.20, published by the American National Standard for Information Technology on Jul. 21, 2015. Details of link services aspects of Fibre Channel may be found in the publication, "Fibre Channel Link Services (FC-LS-3)", Rev. 3.10, published by the American National Standard for Information Technology on Feb. 1, 2014. The Fibre Channel Protocol for SCSI Fourth Version (FCP-4) standard describes the frame format and protocol definitions required to transfer commands and data between a SCSI (Small Computer System Interface) initiator and target using the Fibre Channel family of standards. Further details of FCP-4 may be found in the publication, "Information Technology—Fiber Channel Protocol for SCSI, Fourth Version (FCP-4), Revision 02b" published by the International Committee for Information Technology Standards, on Jan. 3, 2011.

The storage controller may include a plurality of host bus adapters, where each host bus adapter may include a Fibre Channel Interface chip that is an interface to switches that allow communication over a Fibre Channel network between the storage controller and the plurality of hosts.

Fibre Channel storage area networks may use the Fibre Channel protocol (used by the hardware to communicate), the SCSI protocol (used by software applications to communicate to disks), and other protocols for communication. In Fibre channel, network connections are established between node ports (N_Ports) that are there in computers, servers, storage controllers, storage devices, printers, etc., and fabric ports (F_Ports) that are there in the Fibre channel switched fabric. A Fibre Channel switched fabric relies on one or more switches to establish direct, point-to-point connections between the source and target devices. Each Fibre Channel interface chip in the host bus adapters of the storage controller comprises a port that allows communication of the storage controller to the hosts over the Fibre Channel switched fabric.

Fibre Channel login takes place after a link is operational and the login may an extended link service protocol. Port login is a type of Fibre Channel login that is also known as PLOGI. Port login is used to establish a session between two N_Ports (devices) and is necessary before any upper level (i.e., upper layer) commands or operations can be performed. During the port login, two N_Ports (devices) swap service parameters and make themselves known to each other.

SUMMARY OF THE PREFERRED EMBODIMENTS

Provided are a method, a system, and a computer program product in which information maintained in a port control block of an embedded port of a host bus adapter is stored in a host bus adapter memory, wherein the information corresponds to login attributes and state data of remote ports. In response to storing the information in the host bus adapter memory, code in the embedded port is updated. In response to the updating of the code in the embedded port, the stored information is restored from the host bus adapter memory to the port control block of the embedded port.

In additional embodiments, during the storing of the information from the port control block to the host bus adapter memory, the updating of the code in the embedded port, and the restoring of the stored information to the port control block, the remote ports remain logged in to the embedded port.

In further embodiments, the embedded port is a Fibre Channel interface chip that includes port firmware that supports lower level Fibre Channel protocols to communicate over a Fibre Channel fabric, wherein the driver of the host bus adapter supports upper level Fibre Channel protocols.

In certain embodiments, input/output operations are quiesced at least during the updating of the code in the embedded port.

In further embodiments, the updating of the code updates the port firmware.

In certain embodiments, the embedded port performs: receiving, a first message from a driver of the host bus adapter to store the information maintained in the port control block of the embedded port in the host bus adapter memory; receiving a second message from the driver of the host bus adapter to update the code in the embedded port; and receiving a third message from the driver of the host bus adapter to restore the stored information from the host bus adapter memory to the port control block of the embedded port.

In additional embodiments, a driver of the host bus adapter performs: sending a first message to the embedded port to store the information maintained in the port control block of the embedded port in a host bus adapter memory; sending a second message to the embedded port to update the code in the embedded port; and sending a third message to the embedded port to restore the stored information from the host bus adapter memory to the port control block of the embedded port.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

When firmware is upgraded on an embedded port on a host bus adapter in a storage controller, the process may cause the Fibre Channel link to drop. However, remote hosts may need to stay logged into the storage controller. In a switched environment, there are some hosts, such as FICON channels, that attempt to use various mechanisms to recover the link, and such mechanisms may lead to a loss of access for the remote ports, if neither the remote ports nor the embedded port send a new PLOGI (i.e., Port Login) command Certain embodiments provide mechanisms to restore log in information to the embedded ports without requiring a PLOGI to be sent. The embodiments do not require any changes to the FICON architecture.

In certain embodiments, after Input/Output (I/O) has been quiesced (i.e., suspended) and before the port firmware is upgraded, information in the port control block database that includes login attributes and state data for remote ports are saved into host bus adapter memory, where the port control block database in maintained in the embedded port. After the firmware upgrade completes and the link comes back up, the saved information of the port control block database is restored to the port control block database from the host adapter memory. As a result, certain embodiments allow the remote ports to remain logged in without dropping logical paths and without requiring the remote ports to send a PLOGI command, even if the firmware of the embedded port is changed. The avoidance of new login operations may save a significant amount of time in Fibre Channel based communications.

Exemplary Embodiments

Figure 1:
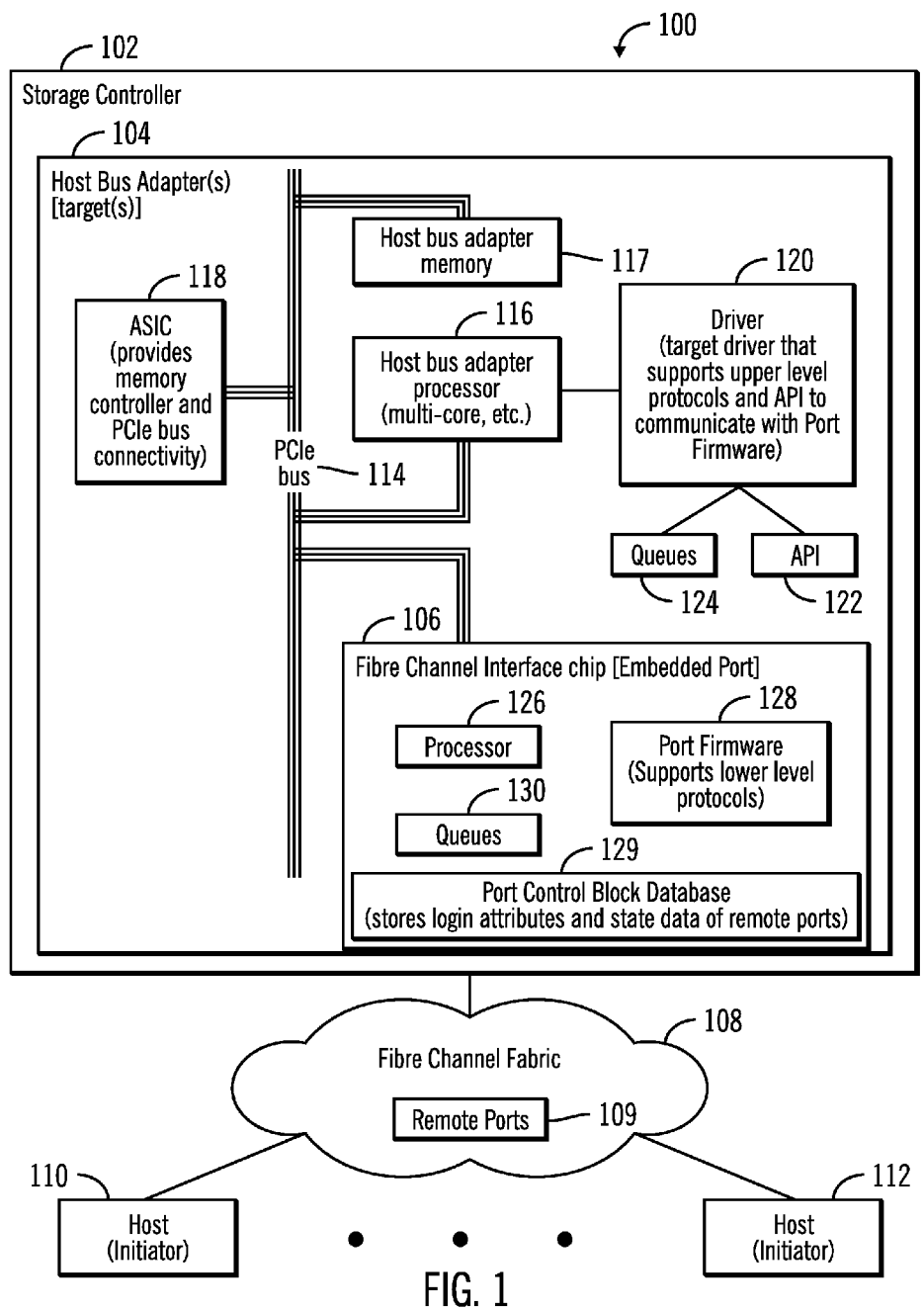
FIG. 1 illustrates a block diagram of a computing environment comprising a storage controller that includes one or more host adapters with one or more Fibre Channel interface chips to couple the storage controller to a Fibre Channel fabric to communicate with a plurality of hosts, in accordance with certain embodiments.

FIG. 1 illustrates a block diagram of a computing environment 100 comprising a storage controller 102 that includes one or more host adapters 104 with one or more Fibre Channel interface chips 106 to couple the storage controller 102 to a Fibre Channel fabric 108, to communicate with a plurality of hosts 110, 112, in accordance with certain embodiments.

The storage controller 102 that includes the host bus adapter 104 may control storage devices (not shown), and receive I/O commands from the hosts 110, 112. The storage controller 102 and the hosts 110, 112 may comprise any suitable computational device including those presently known in the art, such as, a personal computer, a workstation, a server, a mainframe, a hand held computer, a palm top computer, a telephony device, a network appliance, a blade computer, a processing device, etc. In certain embodiments the storage controller 102 may be comprised of one or more storage servers. A plurality of storage servers may provide redundancy because if one storage server undergoes a failure from which recovery is not possible, an alternate storage server may perform the functions of the storage server that failed. The storage controller 102 and the hosts 110, 112 may be elements in any suitable network, such as, a storage area network, a wide area network, the Internet, an intranet. In certain embodiments, the storage controller 102 and the hosts 110, 112 may be elements in a cloud computing environment.

In FIG. 1, the storage controller 102 may include one or more host bus adapters 104 that operate as targets of I/O operations initiated by one or more hosts 110, 112. The host bus adapter 104 does not have control over the arrival of host I/O operations. In certain embodiments, each host bus adapter 104 may be in the form of an adapter card that is plugged into the Peripheral Component Interconnect Express (PCIe) slot of the storage controller 102.

The host bus adapter 104 may include a PCIe bus 114 to which a host bus adapter processor 116, a host bus adapter memory 117, and the Fibre Channel interface chip 106 are coupled. An ASIC 118 may reside in the host bus adapter 104, where the ASIC 118 provides a memory controller and PCIe bus connectivity.

The host bus processor 116 may be a single-core or a multi-core processor. A driver 120 that supports upper level protocols e.g., FCP, FICON, FC-4 layer standards, etc., executes operations on the host bus adapter processor 116. The host bus adapter memory 117 may comprise any suitable memory known in the art such as a Random Access Memory (RAM), a dynamic RAM (DRAM), flash memory, etc. The driver 120 communicates with the Fibre Channel interface chip 106 by using an application programming interface (API) 122. Various data structures, such as queues 124 are maintained by the driver 120. In certain embodiments, the driver 120 may be implemented in software, hardware, firmware or any combination thereof.

The Fibre Channel Interface Chip 106 is also referred to as an embedded port. The embedded port 106 includes a processor 126 and a port firmware 128 that supports lower level protocols like those for framing, signaling, etc. In certain embodiments, functions of the port firmware 128 may be implemented in software, hardware, firmware or any combination thereof. Various data structures, such as queues 130 (e.g., request queues) are maintained by the port firmware 128. The embedded port 106 supports lower level protocols of Fibre Channel and the driver 120 supports upper level protocols. The embedded port 106 that supports lower level protocols of Fibre Channel connects the host bus adapter 104 to the Fibre Channel fabric 108.

The embedded port 106 includes a port control block database 129 that is maintained by the port firmware 128. The port control block database 129 stores login attributes and state data of remote ports 109 (in the Fibre Channel Fabric 108) that may have logged in to the embedded port 106.

The hosts 110, 112 may send I/O commands to the storage controller 102 over the Fibre Channel fabric 108. The embedded port 106 receives the Fibre Channel frames corresponding to the request. The driver 120 which supports upper level protocols of Fibre Channel is in communication with the embedded port 106. The driver 120 uses the embedded port 106 and communicates via the upper level protocols with the hosts 110, 112, and responds to I/O commands via the embedded port 106.

Therefore, FIG. 1 illustrates certain embodiments in which a driver 120 of a host bus adapter 104 in association with the port firmware 128 of an embedded port 106 allows the host bus adapter 104 to process and respond to I/O commands from one or more hosts 110, 112. In certain situations the port firmware 128 may need to be updated without logging out remote ports 109 that may have logged in to the embedded port 106 to perform I/O, and certain embodiments provide mechanisms to perform such updates of the port firmware 128.

Figure 2:
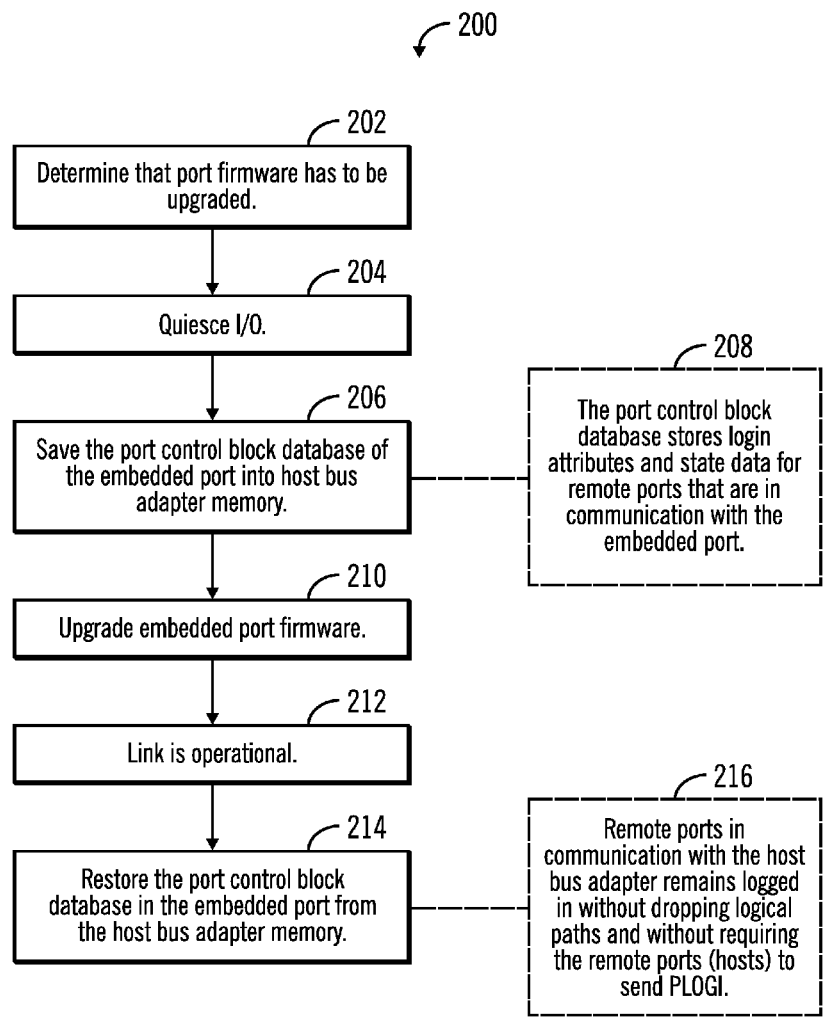
FIG. 2 illustrates a first flowchart that show operations performed in a host bus adapter that has an embedded port, to preserve a port control block during code updates in an embedded port, in accordance with certain embodiments.

FIG. 2 illustrates a first flowchart 200 that show operations performed in a host bus adapter 104 that has an embedded port 106, to preserve the information related to the login attributes and state data of remote ports stored in a port control block database 129 while code updates in the embedded port 106 are occurring, in accordance with certain embodiments.

Control starts at block 202 in which a determination is made that the port firmware 128 has to be upgraded (i.e., updated or changed by changing the code of the firmware 128). To perform such an upgrade of the firmware 128, I/O that is occurring between the remote ports 109 and the embedded port 106 is quiesced (i.e., suspended) [at block 204].

Control proceeds to block 206 in which information stored in the port control block database 129 of the embedded port 106 is saved into the host bus adapter memory 117. The port control block database 129 stores login attributes and state data of the remote ports 109 that are in communication with the embedded port 106 (as shown via reference numeral 208). Therefore, at the conclusion of the operations of block 206, the login attributes and state data of the remote ports 109 that are in communication with the embedded port 106 are saved in the host bus adapter memory 117. In certain embodiments, the entirety of the port control block database 129 may be saved in the host bus adapter memory 117, whereas in other embodiments, information related to the login attributes and state data of the remote ports 109 that are in communication with the embedded port 106 are saved in the host bus adapter memory 117 from the port control block database 129. As long as the information related to the login attributes and state data of the remote ports 109 that are in communication with the embedded port 106 are saved in the host bus adapter memory 117 it is adequate for certain embodiments.

From block 206 control proceeds to block 210 in which the port firmware 128 of the embedded port 106 is upgraded. Once the port firmware 128 of the embedded port 106 is upgraded, the link of the embedded port 106 to the Fibre Channel fabric 108 is operational (at block 212). The information related to the login attributes and state data of the remote ports 109 that were in communication with the embedded port 106 are then restored (at block 214) to the port control block database 129 from the host bus adapter memory 117.

Therefore, FIG. 2 illustrates certain embodiments in which remote ports 109 in communication with the host bus adapter 104 remain logged in without dropping logical paths and without requiring the remote ports 109 (that have previously logged in to the embedded port 106) to send a PLOGI (i.e., port login) to the embedded port 106. As a result, significant time is saved in the computing environment 100 in network communications over Fibre Channel.

Figure 3:
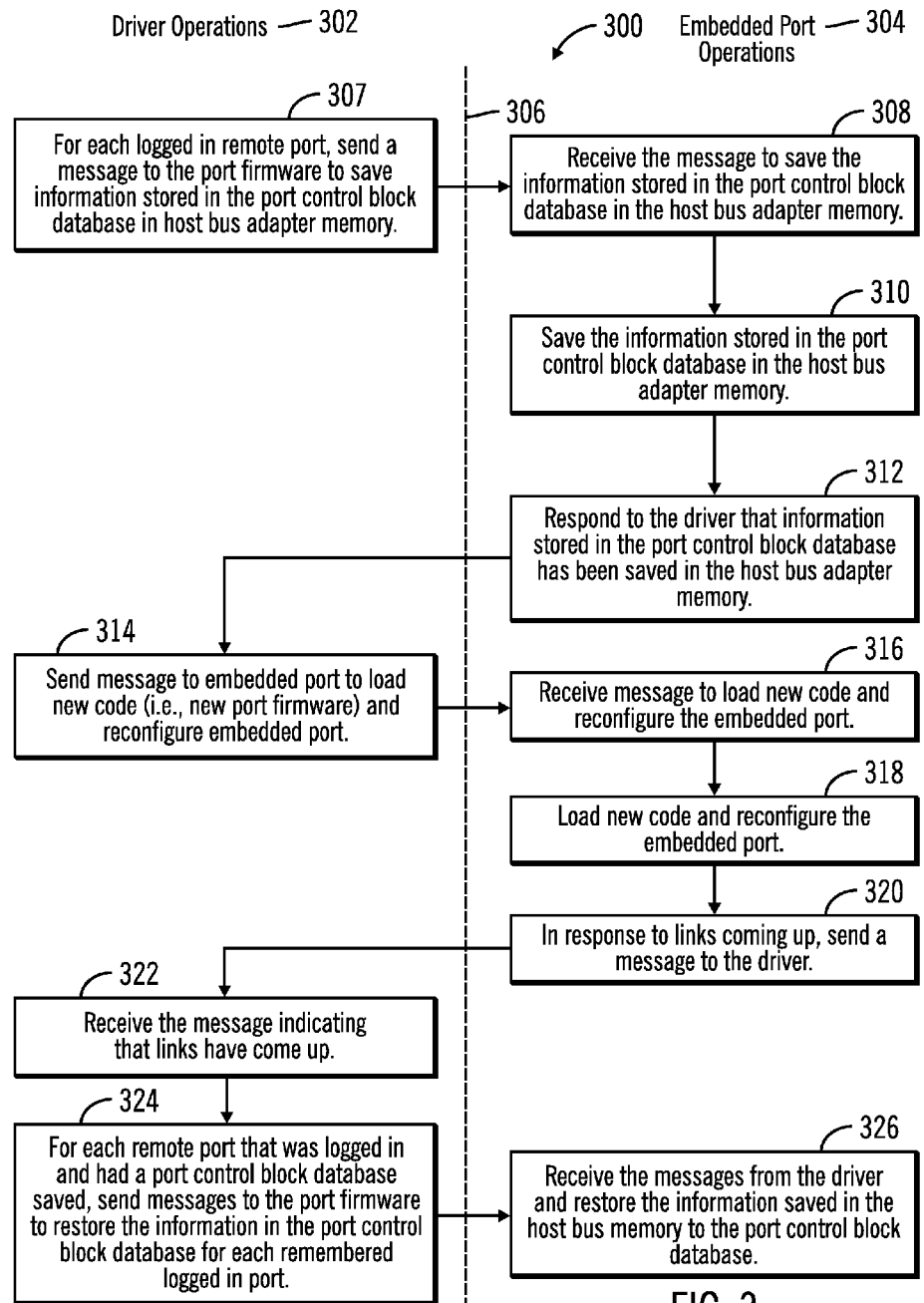
FIG. 3 illustrates a second flowchart that shows operations of a driver of the host bus adapter and an embedded port, to preserve a port control block during code updates in the embedded port, in accordance with certain embodiments.

FIG. 3 illustrates a second flowchart 300 that shows operations of a driver 120 of the host bus adapter 104 and an embedded port 106, to preserve the information related to the login attributes and state data of remote ports stored in a port control block database 129 while code updates in the embedded port 106 are occurring, in accordance with certain embodiments. The driver operations 302 and the embedded port operations 304 are shown to the left and right of the dashed line 306 respectively.

Control starts at block 307 in which the driver 120 sends a message to the port firmware 128 of the embedded port 106. The message requests the embedded port 106 to save information stored in the port control block database 129 for remote ports 109 that are logged in to the embedded port 106, in the host bus adapter memory 117.

The port firmware 128 of the embedded port 106 receives (at block 308) the message to save the information stored in the port control block database 129 in the host bus adapter memory 117, and in response saves (at block 310) the information stored in the port control block database 129 in the host bus adapter memory 117. Control proceeds to block 312, in which the port firmware 128 responds to the driver 120 that information stored in the port control block database 129 has been saved in the host bus adapter memory 117.

The driver then sends (at block 314) a message to the embedded port 106 to load new code (i.e., new port firmware) and reconfigure the embedded port 106. The embedded port 106 receives (at block 316) the message to load new code and reconfigure the embedded port 106. In response, the embedded port 106 loads new code to update, upgrade, or otherwise change the port firmware 128 and reconfigures the embedded port 106 (at block 318).

From block 318 control proceeds to block 320, where in response to the reconfiguration of the embedded port 106, the Fibre Channel links to the Fibre Channel fabric 108 come up, and then the port firmware 128 sends a message to the driver 120.

The driver 120 receives (at block 322) the message indicating that links have come up. For each remote port 109 that was logged in to the embedded port 106 and had information stored in the port control block database 129 saved in the host bus adapter memory 117, the driver 120 sends (at block 324) messages to the port firmware 128. The messages request the port firmware 128 to restore the information in the port control block database 129 for each of the remembered logged in ports, where the remembering is performed by saving the information related to the login attributes and state data of the remote ports 109 in the host bus adapter memory 117. It should be noted that when the port firmware 128 is updated and the embedded port 106 reconfigured, the login information of the remote ports 109 is temporarily lost to the embedded port 106, but after this temporary loss the login information of the remote ports 109 is restored from the host bus adapter memory 117.

From block 324 control proceeds to block 326, in which the port firmware 128 receive the messages sent in block 324 from the driver 120, and restores the information saved in the host bus adapter memory 117 to the port control block database 129.

Therefore, FIG. 3 illustrates certain embodiments in which the operations of the driver 120 and the operations of the embedded port 106 are shown separately. The operations shown in FIG. 3 allow the previously logged in remote ports 109 to continue communications with the embedded port 106 without performing a new port login (PLOGI), even though the port firmware 128 has been changed.

Figure 4:
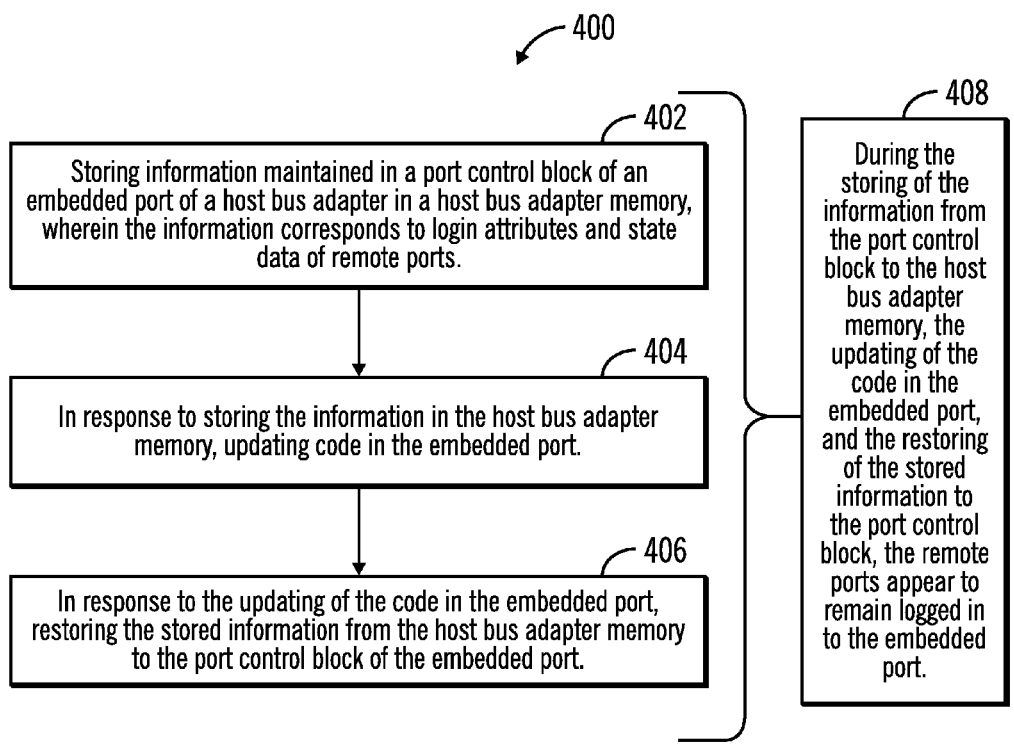
FIG. 4 illustrates a third flowchart that shows operations to preserve a port control block during code updates in an embedded port, in accordance with certain embodiments.

FIG. 4 illustrates a third flowchart 400 that shows operations to preserve the information related to the login attributes and state data of remote ports stored in a port control block database 129, while code updates in the embedded port 106 are occurring, in accordance with certain embodiments.

Control starts at block 402, in which information maintained in a port control block (e.g., port control block database 129) of an embedded port 106 of a host bus adapter 104 is stored in a host bus adapter memory 117, wherein the information corresponds to login attributes and state data of the remote ports 109.

Control proceeds to block 404, in which in response to storing the information in the host bus adapter memory 117, code in the embedded port 106 is updated (e.g., to upgrade or otherwise change the port firmware 128). In response to the updating of the code in the embedded port 106, the stored information is restored from the host bus adapter memory 117 to the port control block 129 of the embedded port 106.

FIG. 4 also shows (in block 408) that during the storing of the information from the port control block 129 to the host bus adapter memory 117, during the updating of the code in the embedded port 106, and during the restoring of the stored information to the port control block 129, the remote ports 109 appear to remain logged in to the embedded port 106.

Therefore, FIGS. 1-4 illustrate certain embodiments in which remote ports 109 that have previously logged on to the embedded port 106 do not have to perform a new login even if the firmware 128 of the embedded port 106 is changed. The avoidance of new login operations may save a significant amount of time in Fibre Channel based communications in the computing environment 100.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 5:
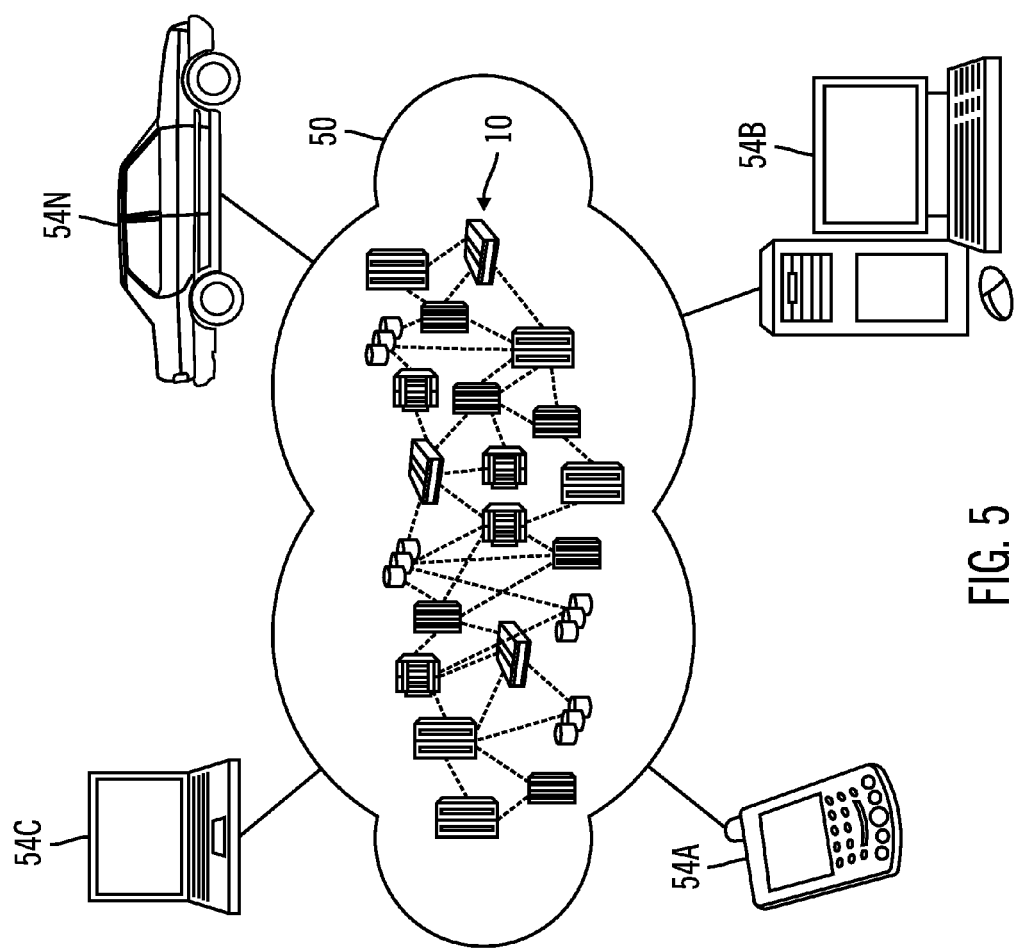
FIG. 5 illustrates a block diagram of a cloud computing environment, in accordance with certain embodiments.

Referring now to FIG. 5, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
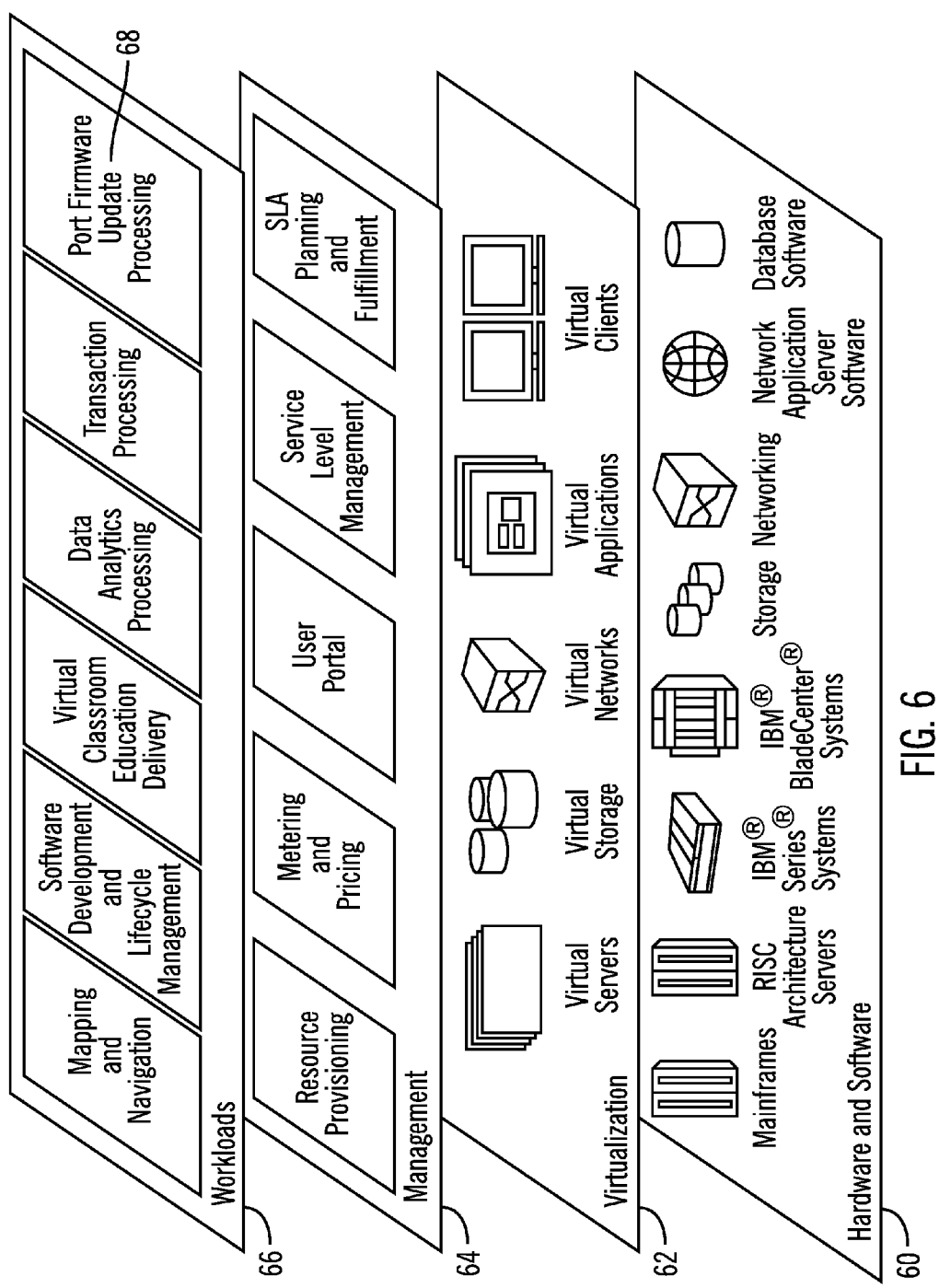
FIG. 6 illustrates a block diagram of further details of the cloud computing environment of FIG. 5, in accordance with certain embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the port firmware update processing 68 as shown in FIGS. 1-5

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 7:
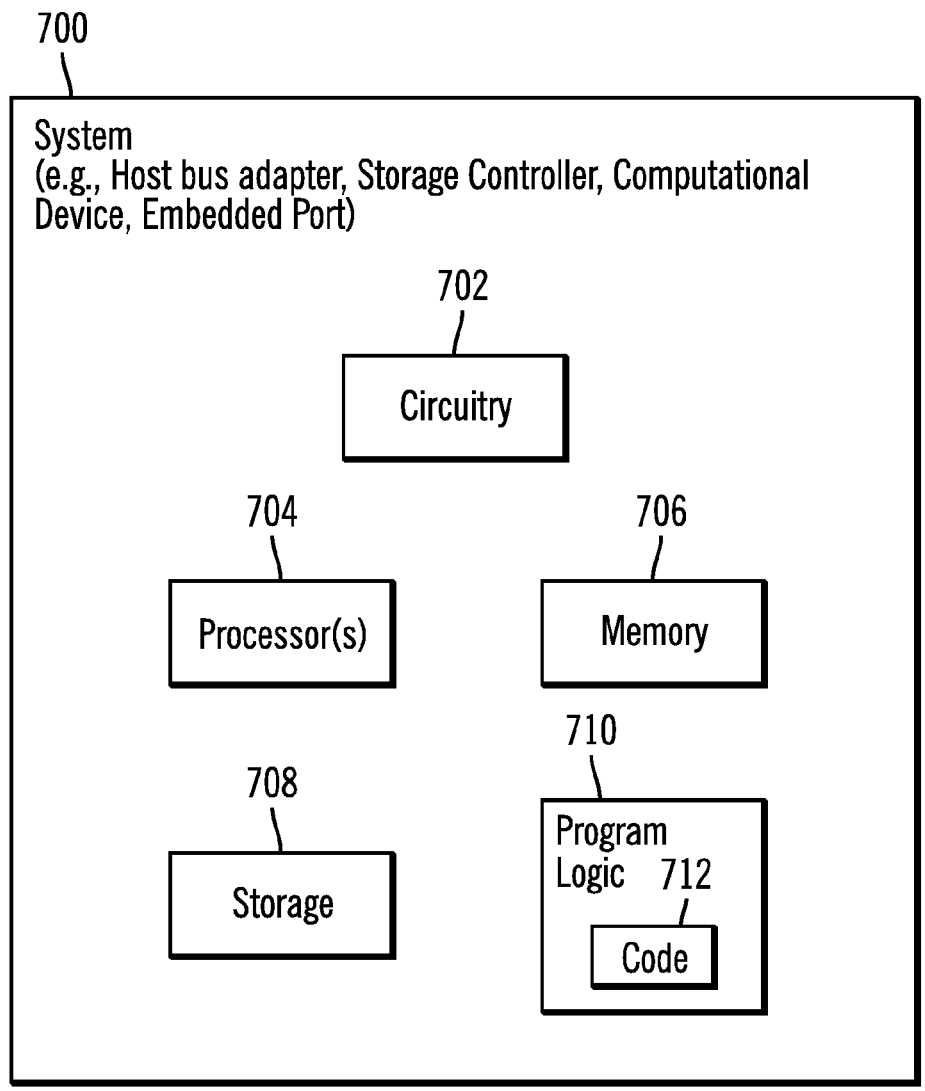
FIG. 7 illustrates a block diagram of a computational system that shows certain elements that may be included in the storage controller, the host bus adapter, the embedded port, and the host shown in FIG. 1, in accordance with certain embodiments.

FIG. 7 illustrates a block diagram that shows certain elements that may be included in the host bus adapter 104, the storage controller 102, the embedded port 106, or other computational devices in accordance with certain embodiments. The system 700 may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   storing information maintained in a port control block of an embedded port of a host bus adapter in a host bus adapter memory, wherein the information corresponds to login attributes and state data of remote ports;
   in response to storing the information in the host bus adapter memory, updating code in the embedded port; and
   in response to the updating of the code in the embedded port, restoring the stored information from the host bus adapter memory to the port control block of the embedded port, wherein the embedded port performs:
   receiving, a first message from a driver of the host bus adapter to store the information maintained in the port control block of the embedded port in the host bus adapter memory;
   receiving a second message from the driver of the host bus adapter to update the code in the embedded port; and
   receiving a third message from the driver of the host bus adapter to restore the stored information from the host bus adapter memory to the port control block of the embedded port.

2. The method of claim 1, wherein during the storing of the information from the port control block to the host bus adapter memory, the updating of the code in the embedded port, and the restoring of the stored information to the port control block, the remote ports remain logged in to the embedded port.

3. The method of claim 1, wherein the embedded port is a Fibre Channel interface chip that includes port firmware that supports lower level Fibre Channel protocols to communicate over a Fibre Channel fabric, and wherein the driver of the host bus adapter supports upper level Fibre Channel protocols.

4. The method of claim 1, wherein input/output operations are quiesced at least during the updating of the code in the embedded port.

5. The method of claim 1, wherein updating of the code updates a firmware of the embedded port.

6. A method, comprising:
   storing information maintained in a port control block of an embedded port of a host bus adapter in a host bus adapter memory, wherein the information corresponds to login attributes and state data of remote ports;
   in response to storing the information in the host bus adapter memory, updating code in the embedded port; and
   in response to the updating of the code in the embedded port, restoring the stored information from the host bus adapter memory to the port control block of the embedded port, wherein a driver of the host bus adapter performs:
   sending a first message to the embedded port to store the information maintained in the port control block of the embedded port in a host bus adapter memory;
   sending a second message to the embedded port to update the code in the embedded port; and
   sending a third message to the embedded port to restore the stored information from the host bus adapter memory to the port control block of the embedded port.

7. A system, comprising:
   a memory; and
   a processor coupled to the memory, wherein the processor performs operations, the operations comprising:
   storing information maintained in a port control block of an embedded port of a host bus adapter in a host bus adapter memory, wherein the information corresponds to login attributes and state data of remote ports;
   in response to storing the information in the host bus adapter memory, updating code in the embedded port; and
   in response to the updating of the code in the embedded port, restoring the stored information from the host bus adapter memory to the port control block of the embedded port, wherein the embedded port performs:
   receiving, a first message from a driver of the host bus adapter to store the information maintained in the port control block of the embedded port in the host bus adapter memory;
   receiving a second message from the driver of the host bus adapter to update the code in the embedded port; and
   receiving a third message from the driver of the host bus adapter to restore the stored information from the host bus adapter memory to the port control block of the embedded port.

8. The system of claim 7, wherein during the storing of the information from the port control block to the host bus adapter memory, the updating of the code in the embedded port, and the restoring of the stored information to the port control block, the remote ports remain logged in to the embedded port.

9. The system of claim 7, wherein the embedded port is a Fibre Channel interface chip that includes port firmware that supports lower level Fibre Channel protocols to communicate over a Fibre Channel fabric, and wherein the driver of the host bus adapter supports upper level Fibre Channel protocols.

10. The system of claim 7, wherein input/output operations are quiesced at least during the updating of the code in the embedded port.

11. The system of claim 7, wherein updating of the code updates a firmware of the embedded port.

12. The system of claim 7, wherein the system is comprised of the embedded port.

13. The system of claim 7, wherein the system comprises a storage controller that includes the host bus adapter.

14. A system, comprising:
   a memory; and a processor coupled to the memory, wherein the processor performs operations, the operations comprising:

storing information maintained in a port control block of an embedded port of a host bus adapter in a host bus adapter memory, wherein the information corresponds to login attributes and state data of remote ports;

in response to storing the information in the host bus adapter memory, updating code in the embedded port; and in response to the updating of the code in the embedded port, restoring the stored information from the host bus adapter memory to the port control block of the embedded port, wherein a driver of the host bus adapter performs:

sending a first message to the embedded port to store the information maintained in the port control block of the embedded port in a host bus adapter memory;

sending a second message to the embedded port to update the code in the embedded port; and sending a third message to the embedded port to restore the stored information from the host bus adapter memory to the port control block of the embedded port.

15. A computer program product, the computer program product comprising a computer readable storage medium having computer readable program code embodied therewith, the computer readable program code configured to perform operations, the operations comprising:

storing information maintained in a port control block of an embedded port of a host bus adapter in a host bus adapter memory, wherein the information corresponds to login attributes and state data of remote ports;

in response to storing the information in the host bus adapter memory, updating code in the embedded port; and in response to the updating of the code in the embedded port, restoring the stored information from the host bus adapter memory to the port control block of the embedded port, wherein the embedded port performs:

receiving, a first message from a driver of the host bus adapter to store the information maintained in the port control block of the embedded port in the host bus adapter memory;

receiving a second message from the driver of the host bus adapter to update the code in the embedded port; and receiving a third message from the driver of the host bus adapter to restore the stored information from the host bus adapter memory to the port control block of the embedded port.

16. The computer program product of claim 15, wherein during the storing of the information from the port control block to the host bus adapter memory, the updating of the code in the embedded port, and the restoring of the stored information to the port control block, the remote ports remain logged in to the embedded port.

17. The computer program product of claim 15, wherein the embedded port is a Fibre Channel interface chip that includes port firmware that supports lower level Fibre Channel protocols to communicate over a Fibre Channel fabric, wherein the driver of the host bus adapter supports upper level Fibre Channel protocols, wherein input/output operations are quiesced at least during the updating of the code in the embedded port, and wherein updating of the code updates a firmware of the embedded port.

18. A computer program product, the computer program product comprising a computer readable storage medium having computer readable program code embodied therewith, the computer readable program code configured to perform operations, the operations comprising:

storing information maintained in a port control block of an embedded port of a host bus adapter in a host bus adapter memory, wherein the information corresponds to login attributes and state data of remote ports;

in response to storing the information in the host bus adapter memory, updating code in the embedded port; and in response to the updating of the code in the embedded port, restoring the stored information from the host bus adapter memory to the port control block of the embedded port, wherein the host bus adapter performs:

sending a first message to the embedded port to store the information maintained in the port control block of the embedded port in a host bus adapter memory;

sending a second message to the embedded port to update the code in the embedded port; and sending a third message to the embedded port to restore the stored information from the host bus adapter memory to the port control block of the embedded port.

19. The computer program product of claim 18, wherein input/output operations are quiesced at least during the updating of the code in the embedded port.

20. The computer program product of claim 18, wherein updating of the code updates a firmware of the embedded port.

* * * * *